UNITED STATES PATENT OFFICE.

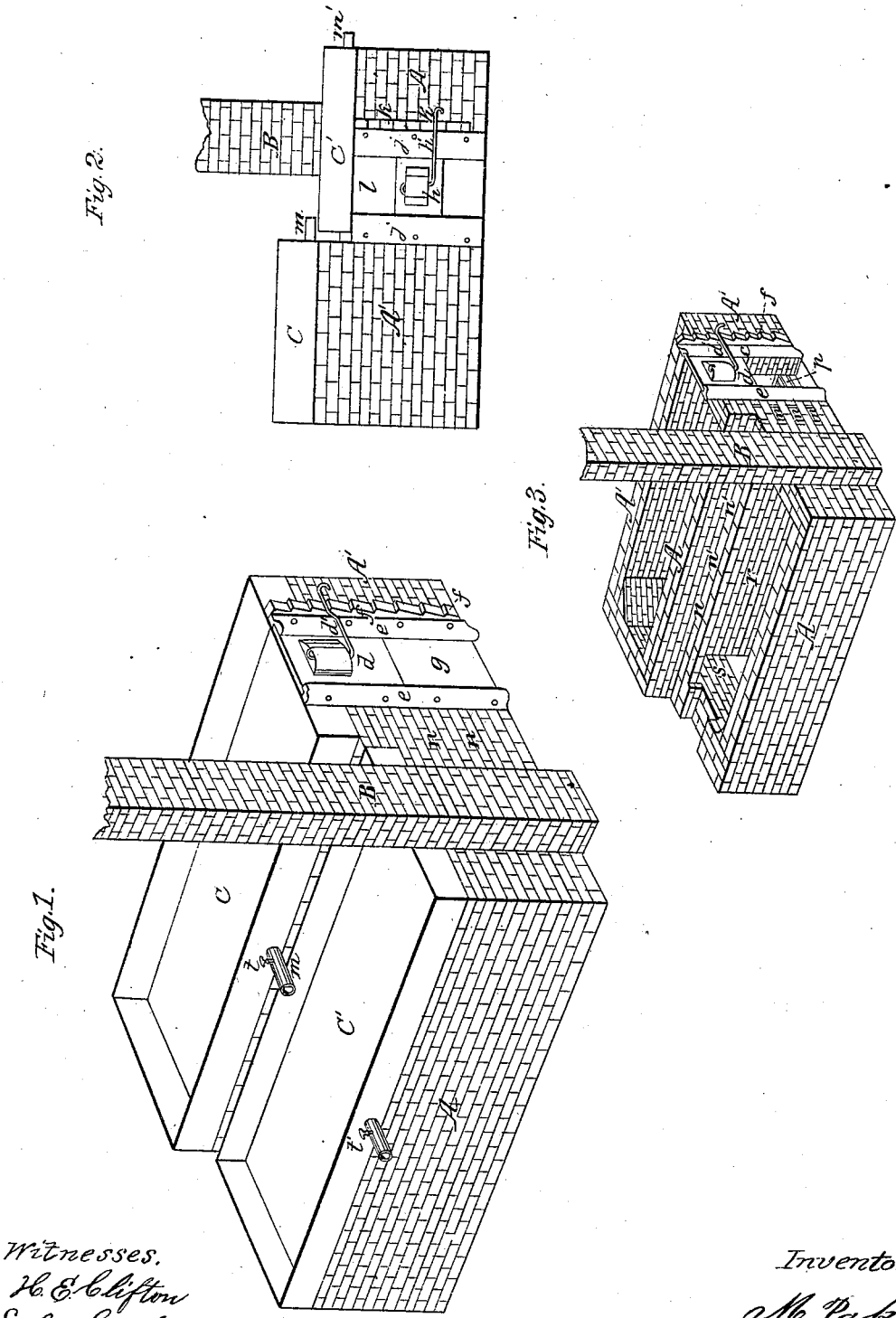

M. PAKE, OF DORCHESTER, ILLINOIS.

IMPROVEMENT IN APPARATUS FOR EVAPORATING.

Specification forming part of Letters Patent No. 39,948, dated September 15, 1863.

*To all whom it may concern:*

Be it known that I, M. PAKE, of Dorchester, in the county of Macoupin and State of Illinois, have invented certain new and useful Improvements in Evaporating-Pans; and I do hereby declare that the following is a clear and exact description thereof, reference being had to the accompanying drawings, and to the letters of reference marked thereon, and made to form a part of this specification.

The object of this invention is the construction of a device for evaporating saccharine juices which may effect great economy in fuel, and which at the same time may be produced at a price within the reach of all ordinary farmers; and the nature of my invention relates to a certain arrangement of a series of two or more evaporating-pans, in combination with a furnace of peculiar construction, as hereinafter set forth and represented.

In reference to the accompanying drawings, Figure 1 is a perspective view representing my improvement as complete and ready for use. Fig. 2 is a plain elevation showing the rear end of the same; and Fig. 3 is a perspective view of the furnace, the pans being removed.

A' A'' represent the walls of that portion of the furnace containing the grate or fire-bed.

A $r$ represent the walls of the secondary compartment of the furnace, which are made somewhat lower than the walls A' A'', in order that the second pan, C', may be sufficiently below the first pan, C, as hereinafter set forth. Communication is had between the two compartments of the furnace, at the rear end thereof, by means of the opening $s$. The wall $r$ is made hollow or with an open space in its interior, into or with which the opening $n$ in the front of the furnace and the openings $n'$ in the top of the wall $r$ communicate, so that a current of cool air may pass constantly between the walls $r$ and A'', and thereby prevent them from becoming too much heated, and thus prevent the fluid contained in the pans from being scorched at the edges of the pans which rest upon the said walls A'' and $r$.

$d$ represents a sliding register-door to the fire-box, by means of which the draft may be regulated or shut off entirely, as may be required, and it may be secured in any desired position by means of the latch $d'$ and the rack $f$.

At the rear end of and communicating with the secondary compartment of the furnace is an opening, $l$, (shown clearly in Fig. 2,) which may be graduated or closed entirely by means of the sliding register $h$, the said register being secured, as desired, by means of the latch $h'$ and rack $k$.

B represents the chimney or flue through which the smoke may escape.

The pans C and C' will be formed of suitable sheet metal. The pan C, being made somewhat deeper than the pan C', and therefore capable of containing a greater quantity of fluid, is adapted to receive the saccharine juices for the first boiling. The said pan C is provided with a pipe, $m$, in which is arranged a stop-cock, $t$, by means of which the contained fluid may be drawn off into the lower pan, C'. The pan C' is also provided with a pipe, $m'$, and stop-cock $t$, by means of which the sirup may be withdrawn when desired. The pan C' is arranged below the pan C, in order that the fluid in pan C may flow into pan C' without changing the position of either of the pans.

Having thus described the construction of my improvement, I will briefly explain its application to use, as follows: A proper reservoir, adapted to contain the fluid to be evaporated, should be arranged in such manner that its contents may be conveniently drawn into the pan C. Fire will then be kindled upon the grate of the first compartment of the furnace, and the fluid allowed to flow into the pan C from the reservoir, a small quantity being allowed to flow into the pan C'. Should the heat at any time be too great, the same may be properly regulated by partially closing the register $d$ and opening the register $h$, so that the heat may always be adapted to the proper evaporation of the fluid, without incurring the danger of scorching the same. When the contents of the pan C is partially evaporated, and has been sufficiently skimmed, the stop-cock $t$ will be turned and the contents of the pan C allowed to flow into the pan C'. The pan C will then be filled again from the reservoir, and while the contents now in the pan C' is being evaporated to the proper consistency required the fresh juice in the pan C will be partially evaporated. The sirup will then be drawn from the pan C', which will be again filled from the pan C, and the pan C again filled from the reservoir.

Should it become necessary at any time for the operator to be absent from the pans while the process of evaporating is in progress, he will close the register $d$ and open the register $h$; then there will be no danger of scorching the contents of the pans, and much fuel will thereby be saved. Great economy in fuel is also effected by accomplishing the rapid boiling of the fresh fluid over the hot fire of the first compartment of the furnace and the necessarily slow boiling of the partially-evaporated fluid over the second compartment, the heat of the first fire, by passing through the opening $s$, being made to perform all the work.

Having thus described my invention, what I claim as new, and desire to secure by Letters Patent, is—

The within-described arrangement of the pans C and C', in combination with the furnace A A' A" $r$ $s$, all being constructed and arranged substantially as and for the purposes set forth.

In testimony of which invention I have hereunto set my hand and seal this 25th day of July, 1863.

M. PAKE. [L. S.]

Witnesses:
  H. E. CLIFTON,
  E. A. SKEELE.